United States Patent
Savant

(10) Patent No.: US 9,460,706 B1
(45) Date of Patent: Oct. 4, 2016

(54) SYSTEMS AND METHODS FOR EXECUTING ANTI-THEFT PROCEDURES FOR A DEVICE

(71) Applicant: Symantec Corporation, Mountain View, CA (US)

(72) Inventor: Anubhav Savant, Culver City, CA (US)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 13/645,598

(22) Filed: Oct. 5, 2012

(51) Int. Cl.
*G10L 21/00* (2013.01)
*G10L 15/00* (2013.01)
*G10L 15/04* (2013.01)
*G10L 15/08* (2006.01)
*G10L 15/183* (2013.01)
*G10L 15/26* (2006.01)
*G10L 15/18* (2013.01)
*G10L 17/22* (2013.01)
*G10L 15/22* (2006.01)
*G10L 15/19* (2013.01)

(52) U.S. Cl.
CPC ............... *G10L 15/00* (2013.01); *G10L 15/04* (2013.01); *G10L 15/08* (2013.01); *G10L 15/18* (2013.01); *G10L 15/183* (2013.01); *G10L 15/1815* (2013.01); *G10L 15/19* (2013.01); *G10L 15/22* (2013.01); *G10L 15/26* (2013.01); *G10L 15/265* (2013.01); *G10L 17/22* (2013.01)

(58) Field of Classification Search
CPC ....... G10L 15/00; G10L 15/04; G10L 15/08; G10L 15/18; G10L 15/1815; G10L 15/183; G10L 15/19; G10L 15/22; G10L 15/26; G10L 15/265; G10L 2015/22; G10L 17/22
USPC ............ 455/411; 704/9, 246, 251, 270, 275
See application file for complete search history.

(56) References Cited

U.S. PATENT DOCUMENTS

| | | | |
|---|---|---|---|
| 6,456,976 B1* | 9/2002 | Kuita | H04M 1/673 704/273 |
| 6,574,592 B1* | 6/2003 | Nankawa | G10L 25/78 704/206 |
| 7,203,721 B1* | 4/2007 | Ben-Efraim | G06F 17/30899 455/413 |
| 8,467,768 B2* | 6/2013 | Mahaffey et al. | 455/411 |
| 8,483,659 B2* | 7/2013 | Mahajan | G06F 21/6245 340/5.52 |
| 8,509,212 B2* | 8/2013 | Sanjeev et al. | 455/411 |
| 8,566,610 B2* | 10/2013 | Hazra et al. | 455/411 |
| 8,634,808 B1* | 1/2014 | Zhong et al. | 455/411 |
| 8,666,366 B2* | 3/2014 | DeAtley | 455/411 |
| 2004/0203601 A1* | 10/2004 | Morriss et al. | 455/411 |
| 2008/0008163 A1* | 1/2008 | Castell | H04L 12/589 370/352 |
| 2010/0210240 A1* | 8/2010 | Mahaffey et al. | 455/411 |
| 2012/0252411 A1* | 10/2012 | Johnsgard et al. | 455/411 |
| 2013/0084846 A1* | 4/2013 | Walker | H04W 12/08 455/419 |

OTHER PUBLICATIONS

TTS—Sasirekha, et al., "Text to Speech: A Simple Tutorial," IJSCE, Mar. 2012.*

* cited by examiner

*Primary Examiner* — Pierre-Louis Desir
*Assistant Examiner* — Forrest F Tzeng
(74) *Attorney, Agent, or Firm* — Holland & Hart LLP

(57) ABSTRACT

A computer-implemented method to execute anti-theft procedures for a device is described. Receipt of a first audio file is detected. The first audio file is converted to a first text file. The first text file is analyzed to identify an anti-theft command. The anti-theft command is executed based at least in part on the analysis.

12 Claims, 10 Drawing Sheets

SYSTEMS AND METHODS FOR EXECUTING ANTI-THEFT PROCEDURES FOR A DEVICE

BACKGROUND

The use of computer devices and computer-related technologies continues to increase at a rapid pace. This increased use of computer devices has influenced the advances made to computer-related technologies. Indeed, computer devices have increasingly become an integral part of the business world and the activities of individual consumers. Computer devices may be used to carry out several business, industry, and academic endeavors. The wide-spread use of these devices has been accelerated by the increased use of communication networks, and computer networks, including the Internet.

Many businesses and individuals use one or more communication and/or computer networks to communicate and share data between the various devices connected to the networks. The productivity and efficiency of employees often require human and computer interaction. Users of computer technologies continue to demand an increase in the efficiency of these technologies. Improving the efficiency of these technologies is desirable to anyone who uses and relies on computer devices.

Computing device may be mobile so that users may carry these systems as they travel, shop, work, etc. These devices may also be used to communicate with other devices. For example, computing devices may be mobile telephones. Mobile computing systems may enter a "locked" state after a predetermined of time, after receiving a specific command from a user input, when powered up, and the like. This locked state may prevent unauthorized users from accessing data that may be stored on the system. In addition, the locked state may prevent unauthorized users from accessing various features and functions of the system. In order to unlock a system, a user may be required to enter a password or other credential via a user input on the device. This may not be possible in certain situations where the computing device is lost or stolen.

SUMMARY

According to at least one embodiment, a computer-implemented method to execute anti-theft procedures for a device is described. Receipt of a first audio file is detected. The first audio file is converted to a first text file. The first text file is analyzed to identify an anti-theft command. The anti-theft command is executed based at least in part on the analysis.

In one embodiment, the first text file may be analyzed to identify a passcode associated with the anti-theft command. Analyzing the text file may include comparing the anti-theft command to a list of anti-theft commands, comparing the passcode to a list of passcode, and executing the anti-theft command based at least in part on the comparison.

In one configuration, a second text file may be generated upon execution of the anti-theft command. The second text file may be converted to a second audio file. The second audio file may be transmitted to a source of the first audio file.

Transmitting the second audio file to the source of the first audio file may include automatically performing a dialing operation to dial a telephone number linked to the source of the first audio file. The second audio file may include a notification that the anti-theft command has been executed.

In one example, detecting the receipt of the first audio file may include detecting a download of the first audio file. In one embodiment, the anti-theft command may be a lock command, a wipe command, or a find command. The first audio file may be a voicemail message.

A device configured to execute anti-theft procedures may also be described. The device may include a processor and memory in electronic communication with the processor. The device may further include instructions stored in the memory. The instructions may be executable by the processor to detect a receipt of a first audio file, convert the first audio file to a first text file, analyze the first text file to identify an anti-theft command, and execute by the processor the anti-theft command based at least in part on the analysis.

A computer-program product to execute anti-theft procedures for a device may also be described. The computer-program product may include a non-transitory computer-readable medium having instructions thereon. The instructions may be executable by a processor to detect a receipt of a first audio file, convert the first audio file to a first text file, analyze the first text file to identify an anti-theft command, and execute by the processor the anti-theft command based at least in part on the analysis.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
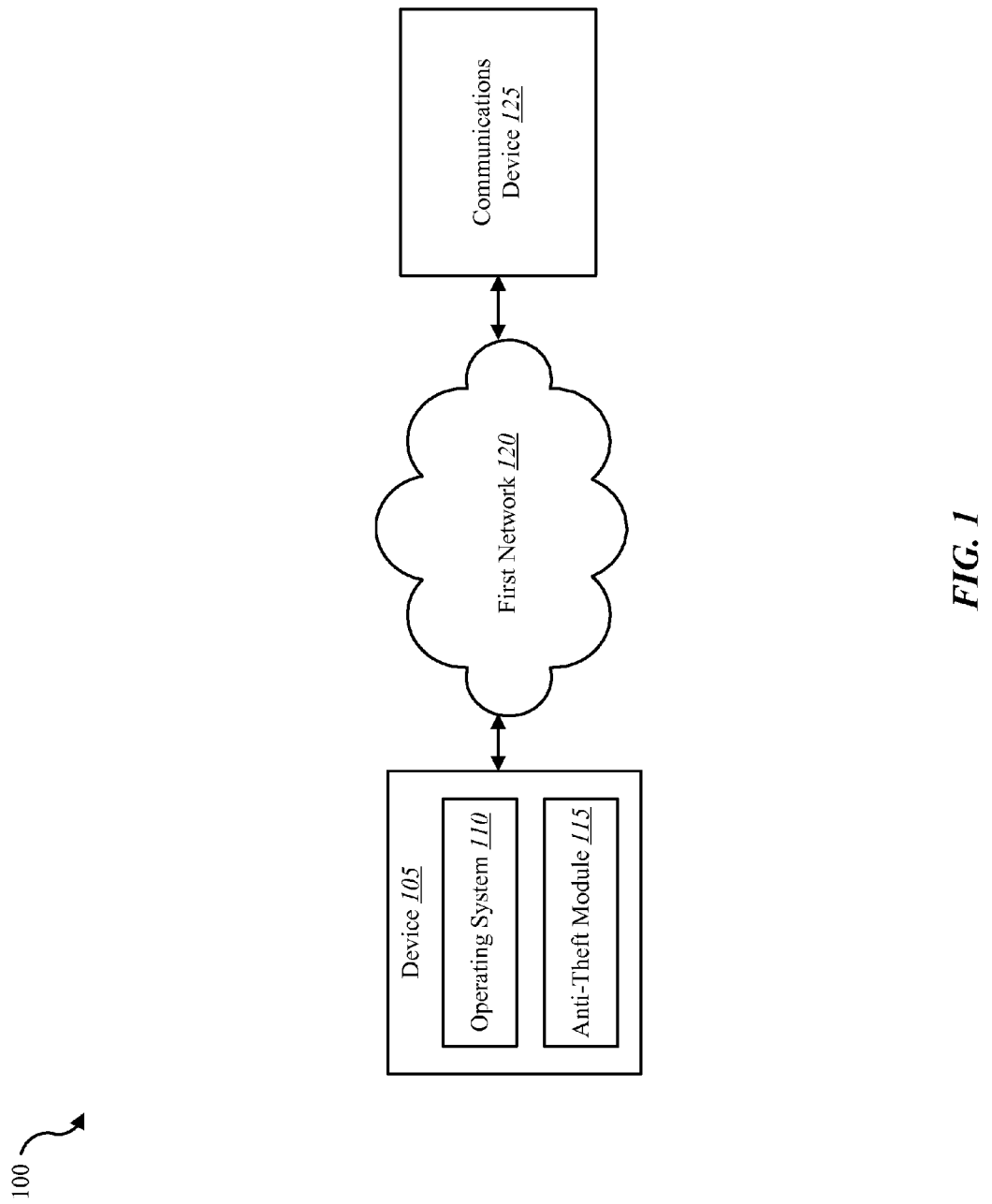
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Anti-theft procedures for mobile devices, such as, but not limited to mobile phones, provide a user with the ability to execute security-related commands remotely on the device. Examples of these commands may include lock, wipe, etc. The ability to lock the device immediately prevents access to valuable data stored within the device. For example, a lock command may be executed on a mobile phone that has been lost or stolen. This command may result in locking the screen of the phone. The locked screen may further display a custom "good Samaritan" message that includes contact information of the owner of the phone to facilitate recovery of the phone. The benefits of the lock command are further evident in the event that the phone's built-in lock screen is not configured to automatically lock the screen after a period of inactivity.

Currently, users who wish to remotely control a mobile device need to use a web portal or a short message service (SMS)-capable mobile device to send these security commands. The user may transmit the command via the web portal or as an SMS message. The command may be transmitted together with a password or passcode.

If access to the Internet or another SMS-capable device is not readily available, the mobile device may remain vulnerable. Even if these options are available, each option presents some drawbacks. For example, use of an SMS-capable device to send the command to the lost device may expose the password of the lost device to the user of the device that sent the SMS message.

In one embodiment, the present systems and methods may use voicemail as a channel to send anti-theft commands to a comprised phone. Any phone (even a roadside public telephone) may be used to send a voicemail. The present systems and methods may involve registering an application on the phone for events related to the arrival of a new voicemail message. Events may include receipt of a voicemail notification, receipt of an email that includes an audio file (which may be a voicemail), etc.

In one configuration, a voicemail message may be sent to a lost, stolen, or otherwise compromised phone. The voicemail may include an anti-theft command and password provided by a user of the compromised phone. For example, the command may be "lock" and the password may be "1234". The password may be configured during the set up and installation of the application on the phone. When a new voicemail message is available, the application may receive a notification and may download the voicemail message. The application may then use a standard voice-to-text recognition algorithm to analyze the audio message to identify and retrieve the command and password. If both the command and password match a command and password previously stored on the phone (or in a database remote to the phone), the application may execute the command on the compromised phone. Upon successful completion of the command, the application may generate a text file with an acknowledgment that the command was executed. The text file may be converted to an audio file and the application may initiate a phone call to the phone number from which the voicemail message originated. The user may receive the audio file via the phone used to send the voicemail message which includes an audio acknowledgment that the command was executed on the compromised phone.

Turning now to the Figures, FIG. 1 is a block diagram 100 illustrating one embodiment of an environment in which the present systems and methods may be implemented. In one configuration, a device 105 may communicate with a communications device 125 across a first network 120. The device 105 may include a mobile phone, a laptop, a tablet, a personal digital assistance (PDA), a netbook, or any other type of portable computing or mobile communications device. The communications device 125 may be any type of device capable of communicating with the device 105 across the first network 120. For example, the communications device 125 may be a landline telephone, a mobile phone, a satellite phone, or the like. The first network 120 may be a cellular network, a public switch telephone network, voice-over IP network, or any other type of communications network.

In one embodiment, the device 105 may include an operating system 110 and an anti-theft module 115. The operating system 110 may manage hardware resources and other services provided by the device 105. The anti-theft module 115 may analyze certain information and execute certain commands on the device to further secure data and other resources stored on the device 105. Details regarding the anti-theft module 115 are described below.

Figure 2:
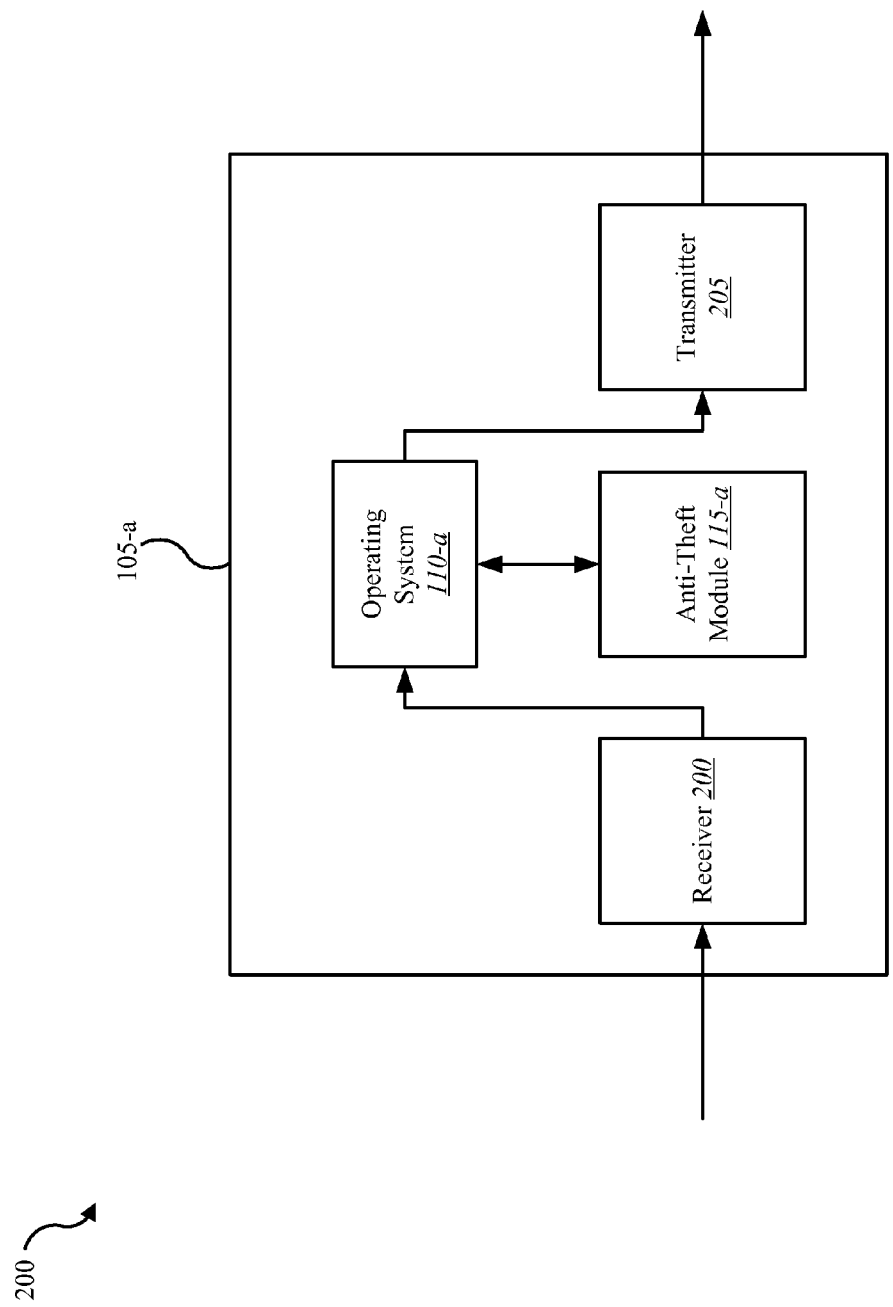
FIG. 2 is a block diagram illustrating one embodiment of a device 105-*a* that may implement the present systems and methods.

FIG. 2 is a block diagram 200 illustrating one embodiment of a device 105-a that may implement the present systems and methods. The device 105-a may be an example of the device 105 illustrated in FIG. 1.

The components of the device 105-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the device 105-a may include a receiver 200 and a transmitter 205. The receiver 200 may receive information and messages that may be sent from another device, such as the communications device 125. The receiver 200 may pass the received information or message to an operating system 110-a. The operating system 110-a may receive the information or message and notify an anti-theft module 115-a that information or a message is present or has been received by the receiver 200. The anti-theft module 115-a may retrieve the information or message and carry out certain commands specified by the information or the message. The transmitter 205 may transmit a notification to the source of the information or message. The notification may indicate that the command has been executed.

In one embodiment, the receiver 200 may receive a voicemail message and the message may be passed to the operating system 110-a. Upon receiving the voicemail message, the operating system 110-a may notify the anti-theft module 115-a that a voicemail message has been received by and/or downloaded to the device 105-*a*. The module 115-*a* may analyze the voicemail message to identify and extract a command and password within the voicemail message. Upon verifying the password and command, the anti-theft module 115-*a* may carry out the command included in the voicemail message on the device 105-*a*. Upon executing the command, the anti-theft module 115-*a* may generate a notification message indicating that the command has been executed. The transmitter 205 may transmit the notification to the device that originated the voicemail message.

Figure 3:
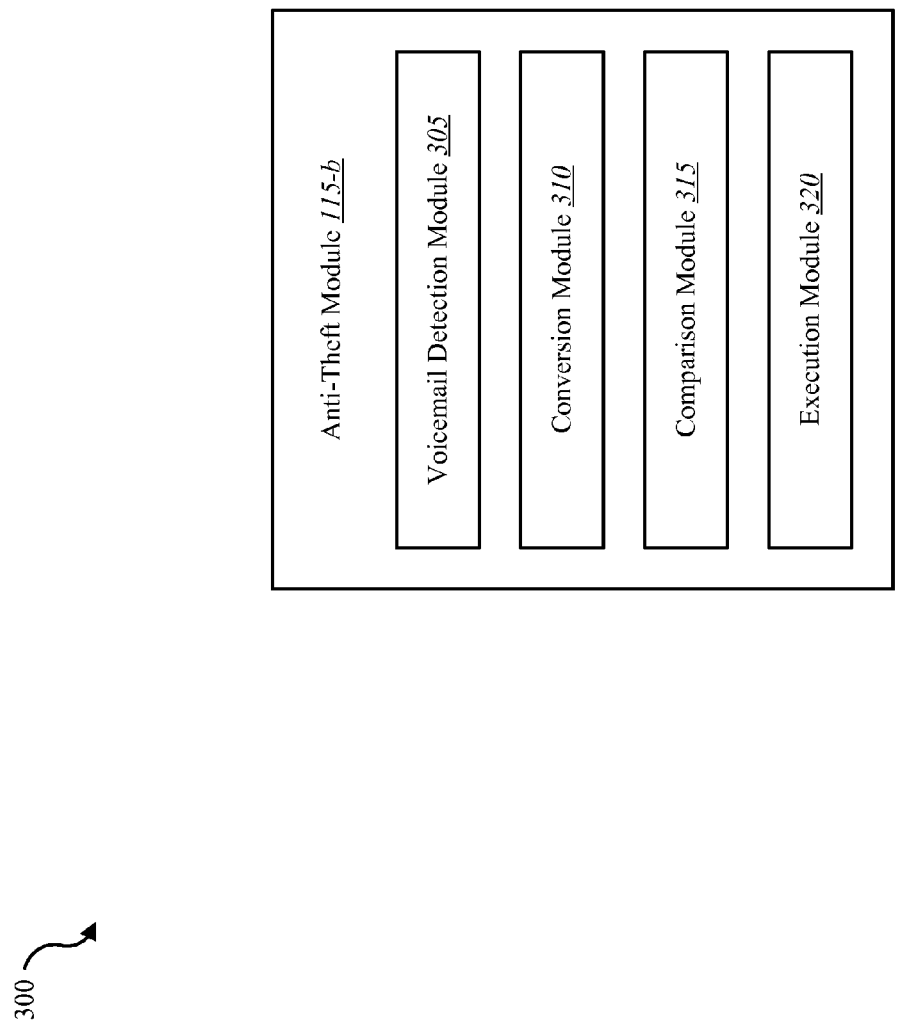
FIG. 3 is a block diagram illustrating one embodiment of an anti-theft module.

FIG. 3 is a block diagram illustrating one embodiment of an anti-theft module 115-*b*. The anti-theft module 115-*b* may be an example of the anti-theft module 115 illustrated in FIGS. 1 and/or 2.

In one configuration, the anti-theft module 115-*b* may include a voicemail detection module 305, a conversion module 310, a comparison module 315, and an extraction module 320. The voicemail detection module 305 may detect a trigger that indicates a voicemail message is available. The trigger may be provided by the operating system 110. The trigger may include a notification indicating a voicemail message has been downloaded to a memory location of the device 105. The trigger may be receipt of an email message that includes an audio file of a certain size. For example, the anti-theft module 115-*b* may be a plug-in to an email exchange application executing on the device 105. The device 105 may be a laptop. In one example, the laptop may become compromised (e.g., stolen, lost, etc.). The email exchange executing on the compromised laptop may receive an email message that include a voicemail message directed to a particular telephone number. For example, the owner of the compromised laptop may place a call to a telephone number where voicemail messages for that telephone number are attached as an audio file and sent via email to the email exchange application running on the compromised laptop.

The conversion module 310 may analyze the voicemail message to convert the audio of the voicemail message to a text file. The comparison module 315 may analyze the text file to identify certain key words within the text. For example, the comparison module 315 may identify and extract text that represents a command and a password. The module 315 may then compare the extracted text to a list of accepted commands and verified passwords. The execution module 320 may execute the command based upon the comparison provided by the comparison module 315. For example, if the extracted text representing the command and the extracted text representing the password match a command from the list of commands and match a password from the list of verified passwords, the executing module 320 may execute the command on the device 105. Upon executing the command, the module 320 may generate a notification indicating the command has been executed.

If, however, the command or password within the voicemail message do not match an accepted command or verified password, a failure notification may be generated indicating the command has not been executed. In another embodiment, no failure notification may be generated and the non-receipt of a notification may reveal to the user of the compromised device that the command has not been executed.

Figure 4:
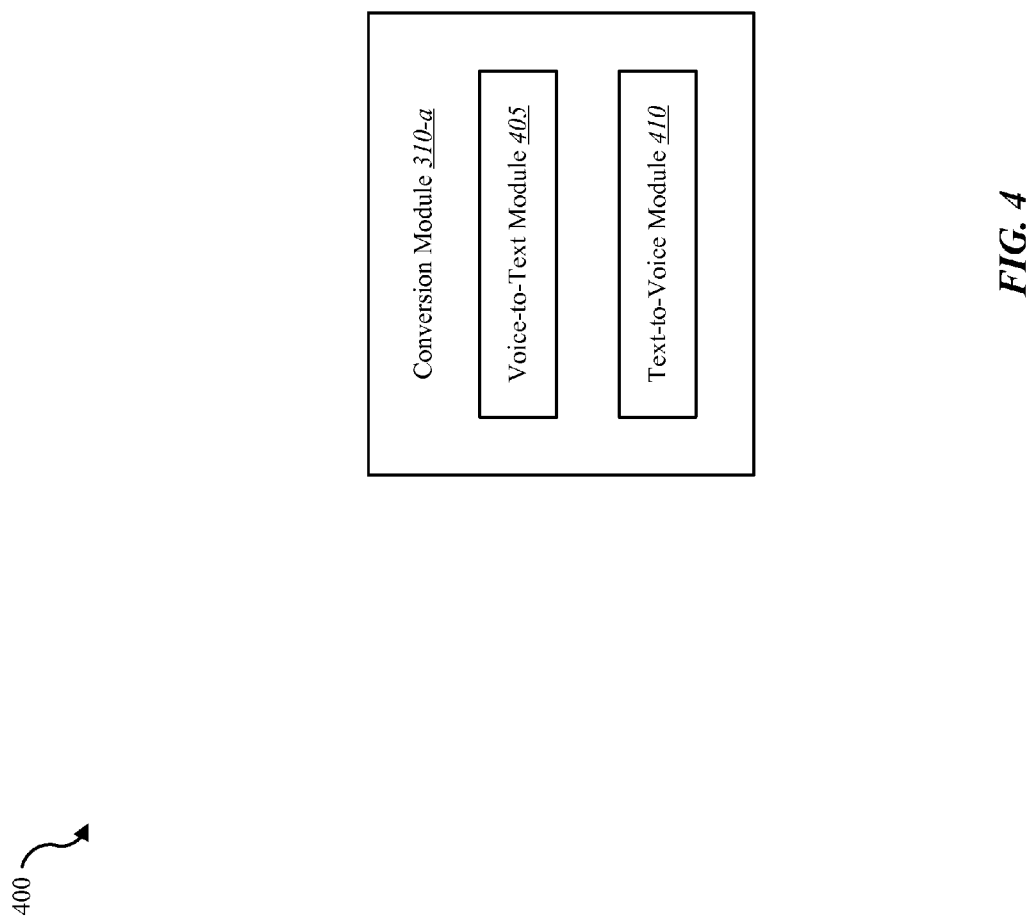
FIG. 4 is a block diagram illustrating one embodiment of a conversion module.

FIG. 4 is a block diagram illustrating one embodiment of a conversion module 310-*a*. The conversion module 310-*a* may be an example of the conversion module 310 illustrated in FIG. 3.

In embodiment, the conversion module 310-*a* may include a voice-to-text module 405 and a text-to-voice module 410. In one example, the voice-to-text module 405 may convert an audio file, such as a voicemail message, to a text file. Similarly, the text-to-voice module 410 may convert a text file to an audio file. As previously explained, upon receiving a voicemail message (e.g., an audio file), the voice-to-text module 405 may convert the audio file to a text file. Upon converting the audio file to the text file, the text file may be analyzed to extract text representing a password and text representing a password.

After executing the command on the device 105, the anti-theft module 115 may generate a text file that includes a notification that the command has been executed. The text-to-voice module 410 may convert the text file to an audio file. The transmitter 210 of the device may transmit the audio file to a device from which voicemail message originated. A user (e.g., the owner of the compromised device 105) may access the device (e.g., a telephone) to listen to the audio file. This allows the user of the compromised device 105 to become aware that the command has been executed on the compromised device 105.

Figure 5:
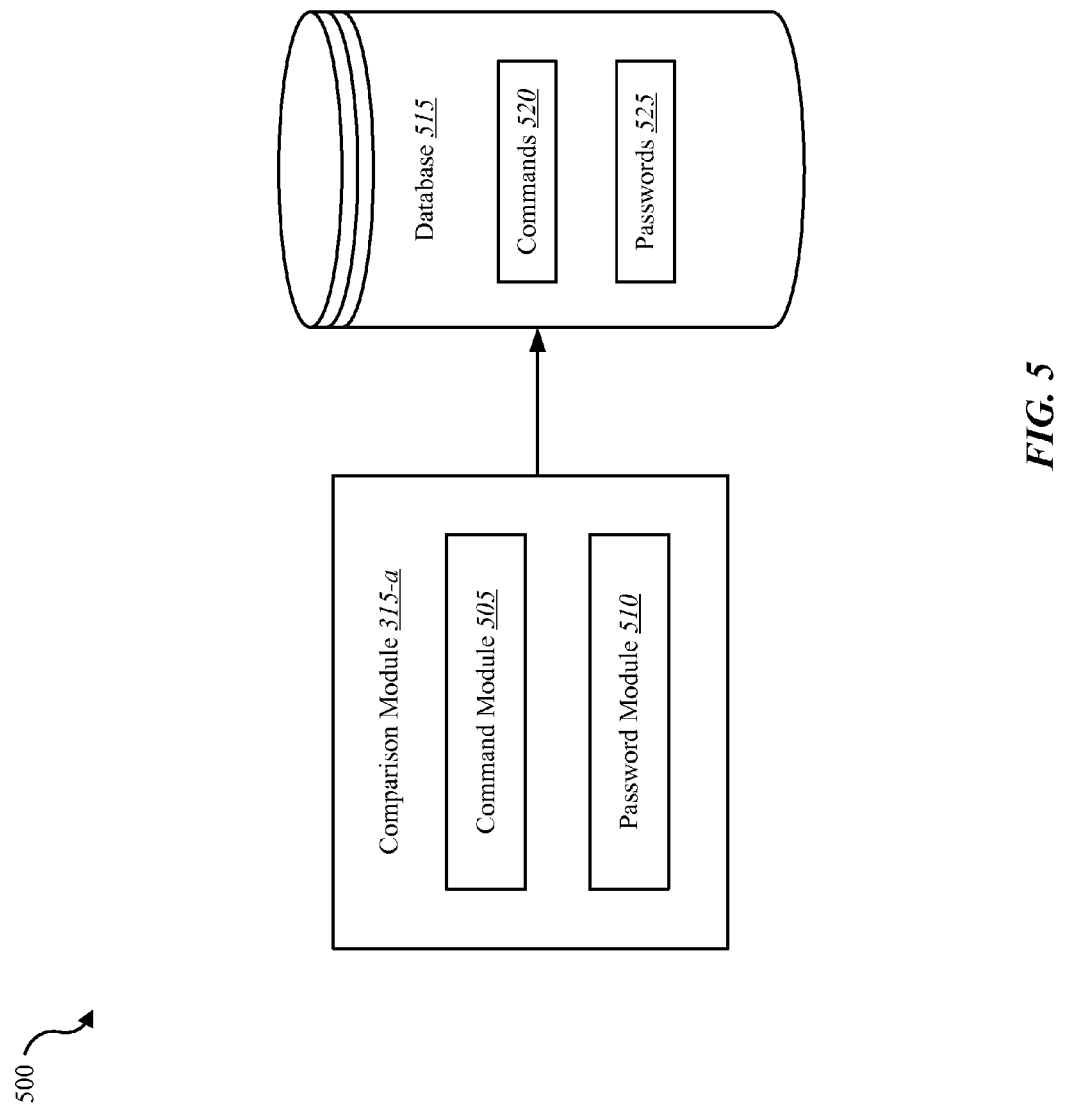
FIG. 5 is a block diagram illustrating one embodiment of an environment in which the present systems and methods may be implemented.

FIG. 5 is a block diagram illustrating one embodiment of an environment 500 in which the present systems and methods may be implemented. In one configuration, a comparison module 315-*a* may communicate with a database 515. The comparison module 315-*a* may be an example of the comparison module 315 illustrated in FIG. 3.

In one configuration, the comparison module 315-*a* may include a command module 505 and a password module 510. The command module 505 may identify and extract a command from a text file that was converted from an audio file representing a voicemail message. Similarly, the password module 510 may identify and extract a password in the text file. The command module 505 may compare the extracted command to a list of commands 520 stored in the database 515. The password module 510 may also compare the extracted password with a list of passwords 525 included in the database 515. The command may include a lock command, a wipe command, a scream command, a location command, etc. The password module 510 may compare the extracted password to the list of passwords 525 stored in the database. If the command module 505 and the password module 510 determine that the command and password in the text file match a command and password stored in the database 515, the command may be carried out.

In one embodiment, the database 515 may be stored locally on the compromised device 105. Alternatively, the database 515 may be stored remotely from the compromised device 105. The comparison module 315-*a* may access the database 515 (if stored remotely) via a network connection.

Figure 6:
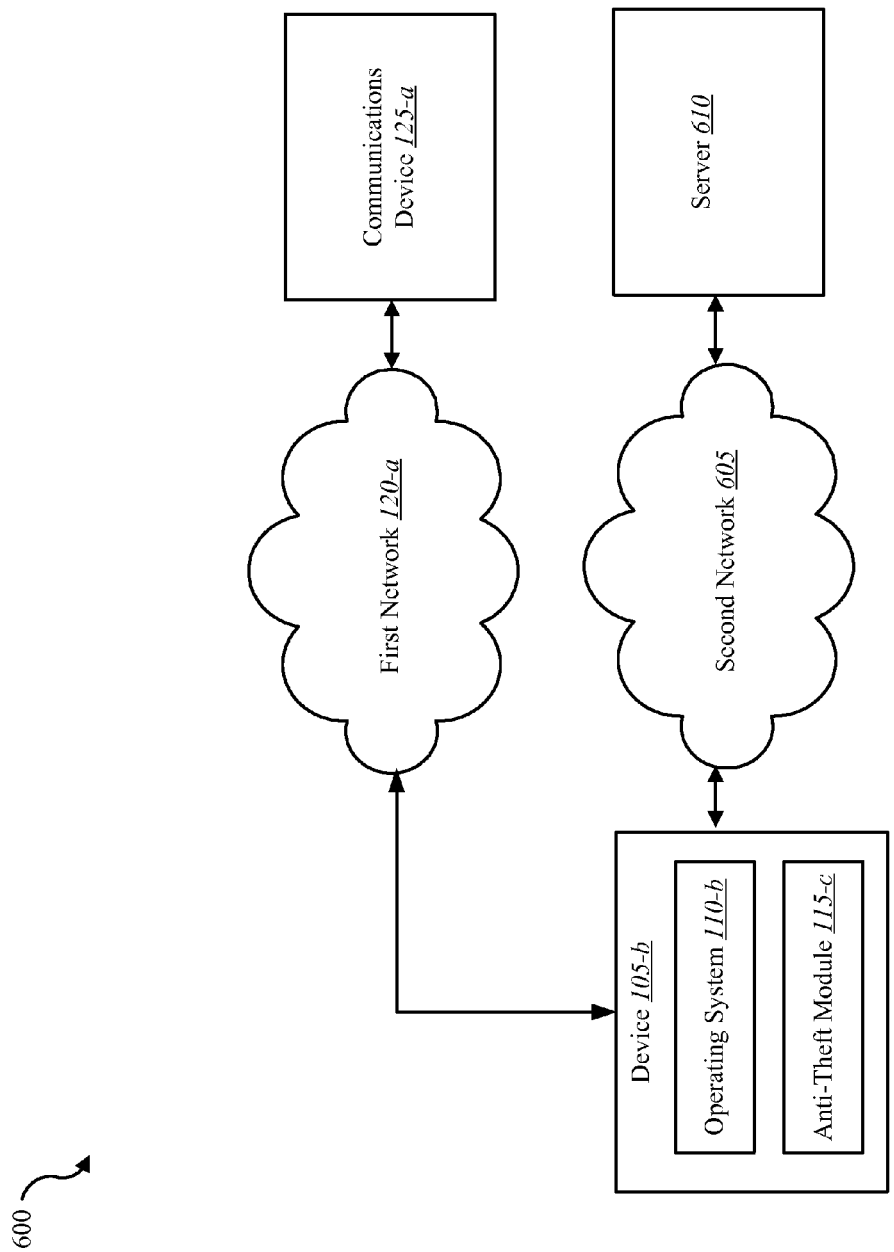
FIG. 6 is a block diagram illustrating one embodiment of an environment in which the present systems and methods may be implemented.

FIG. 6 is a block diagram illustrating one embodiment of an environment 600 in which the present systems and methods may be implemented. In one configuration, a device 105-*b* may communicate with a communications device 125-*a* and a server 610. The device 105-*b* may be an example of the device 105 illustrated in FIGS. 1 and/or 2. The device 105-*b* may include an operating system 110-*b* and an anti-theft module 115-*c*. The device 105-*b* may communicate with the communications device 125-*a* across a first network 120-*a*. The first network 120-*a* may be an example of the first network 120 illustrated in FIG. 1.

In one embodiment, device 105-*b* may be compromised (e.g., lost, stolen, etc.). The owner or user of the compromised device 105-*b* may use the communications device 125-*a* to create a voicemail message to be delivered to the device 105-*b*. For example, if the device 105-*b* is a mobile phone, the user may use the communications device 125-*a* to call the telephone number associated with the device 105-*b* and generate a voicemail message to be delivered and/or downloaded by the device 105-*b*. If the compromised device 105-*b* is a laptop running an email exchange program, the user may use the communications device 125-*a* to dial a telephone number of a telephone where voicemail messages generated for that telephone number are transmitted via email (as an audio file attachment) to the email exchange running on the laptop (i.e., the device 105-*b*).

The communications device 125-*a* may transmit the voicemail message to the device 105-*b* across the first network 120-*a*. As previously explained, the operating system 110-*b* may notify the anti-theft module 115-*c* that a voicemail message is available and/or downloaded to the device 105-*b*. The anti-theft module 115-*c* may analyze the voicemail message to determine the likelihood that the message includes a command and password. For example, the anti-theft module 115-*c* may identify the size (e.g., the length) of the voicemail message. If the message is longer than a certain time, the module 115-*c* may determine that the message is too long to include a command and password. Similarly, if the voicemail is sent as an attachment to an email message, the module 115-*c* may identify the size of the audio file attached to the email message. If the size of the file is large, the module 115-*c* may determine that the voicemail message attached to the email message is too large to only include a command and password. If the anti-theft module 115-*c* determines that the voicemail message does not include a command and password, the module 115-*c* may not further analyze the message.

If, however, the module 115-*c* determines that the voicemail message is of a certain size where it is likely that the message includes a command and password, the message may be converted from an audio file to a text file. The text file may be analyzed to identify and extract the command and password. The extracted command and password may be compared against a list of approved commands and verified passwords. Upon verifying the command and password, the anti-theft module 115-*c* may execute the command on the device 105-*b*.

In one example, the execution of the command may include transmitting information to the server 610 across the second network 605. For example, the command in a voicemail message (converted to a text file) may be a command to locate the device 105-*b*. As a result, the anti-theft module 115-*c* may execute the command by capturing pictures when the device 105-*b* is in motion, providing global positioning satellite (GPS) information, and the like. The gathered information may then be continuously transmitted or passed to the server 610 across the second network 605. Instead of transmitting the information to the server 610 in a continuous fashion, the device 105-*b* may transmit the gathered information periodically to the server 610. A user may then access the information stored on the server 610 via web portal. For example, the user may access a web browser and direct the web browser to a particular web page. The user may enter a password into the web page along with other identifying information. Once validated, the user may access the information that had been passed by the device 105-*b* to the server 610 across the second network 605.

The voicemail message may include other commands for the anti-theft module 115-*c* to execute. For example, the commands may include a lock command, a wipe command, a scream command, and the like. The lock command may result in a screen or display of the device 105-*b* being locked. The screen may only be unlocked with the proper credentials (e.g., username and password). The locked screen may include a "good Samaritan" message that includes a message that the device 105-*b* has been lost, stolen, or otherwise compromised. The "good Samaritan" message may also display contact information for the owner of the device. If the device 105-*b* is lost and a "good Samaritan" finds the device 105-*b*, the message will include the necessary information for the "good Samaritan" to return the device 105-*b* to the rightful owner. As a result, if the device 105-*b* is stolen, lost, etc., the owner of the device 105-*b* may use the communications device 125-*a* to send a voicemail message to the device 105-*b*. The communications device 125-*a* may be any type of device capable of generating a voicemail message. The voicemail message may include a command and a password. The command may provide further security for the data stored on the device 105-*b* as well as security for the various hardware resources of the device 105-*b*.

Figure 7:
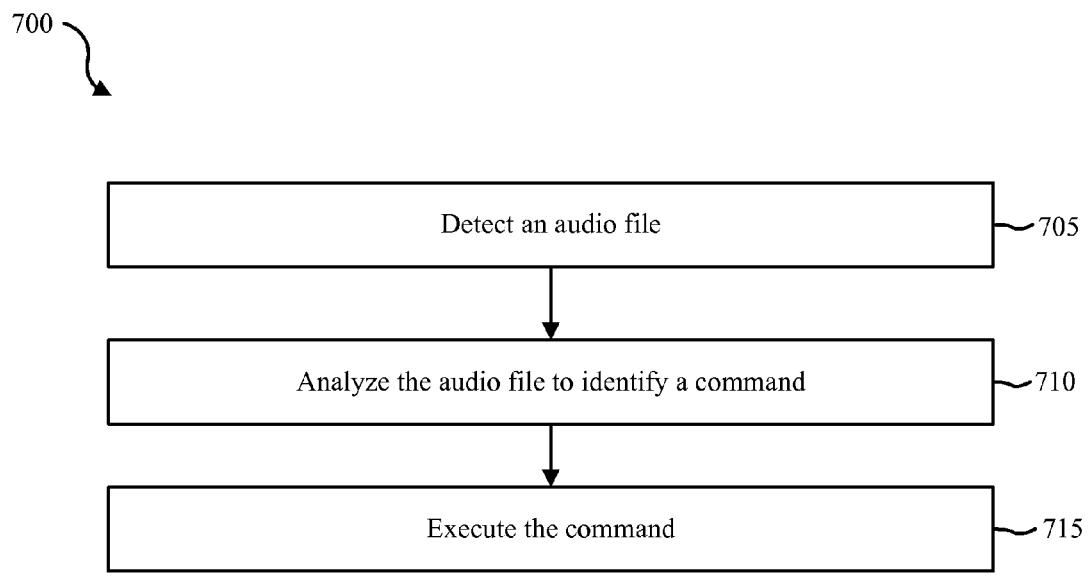
FIG. 7 is a flow diagram illustrating one embodiment of a method to enhance anti-theft procedures for a device.

FIG. 7 is a flow diagram illustrating one embodiment of a method 700 to enhance anti-theft procedures for a device. In one configuration, the method 700 may be implemented by a device 105 such as the device 105 illustrated in FIGS. 1, 2 and/or 6. In particular, the method 700 may be implemented by the anti-theft module 115 of FIGS. 1, 2, 3 and/or 6.

At block 705, an audio file may be detected. For example, the detection of the audio file may occur upon downloading the audio file to the device 105 or downloading an email message that includes the audio file as an attachment. In one example, the audio file may include a voicemail message. The voicemail message may be sent from a separate communications device, such as the communications device 125. At block 710, the audio file may be analyzed to identify a command. At block 715, the command may be executed.

Thus, the method 700 may provide an improved anti-theft procedure using an audio file (such as a voicemail message) to secure data and prevent theft of such data on a mobile device. It should be noted that the method 700 is just one implementation and that the operations of the method 700 may be rearranged or otherwise modified such that other implementations are possible.

Figure 8:
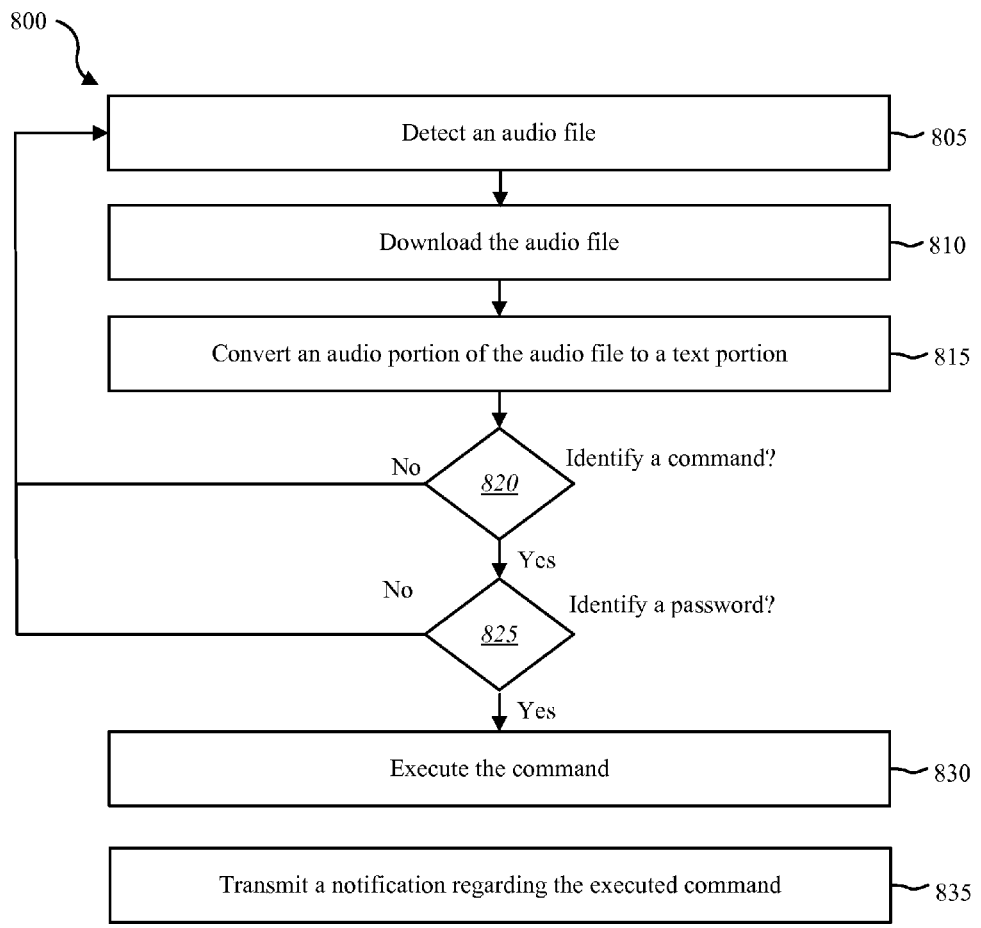
FIG. 8 is a flow diagram illustrating one embodiment of a method for using voicemail to improve anti-theft techniques for a mobile device.

FIG. 8 is a flow diagram illustrating one embodiment of a method 800 for using voicemail to improve anti-theft techniques for a mobile device. The method 800 may be implemented by the device 105 illustrated in FIGS. 1, 2 and/or 6. In particular, the method 800 may be implemented by the anti-theft module 115 of FIGS. 1, 2, 3 and/or 6.

At block 805, an audio file may be detected. At block 810, the audio file may be downloaded to the device 105. At block 815, an audio portion of the audio file may be converted to a text portion. For example, the audio file may include a voicemail message. The voicemail message may be converted from an audio file to a text file. In one configuration, a determination 820 may be made as to whether a command is identified within the text portion. If it is determined 820 that a command is not identified, the method 800 may return to detect an audio file. If, however, it is determined that a command is identified, a second determination 825 may be made as to whether a password is identified. If it is determined 825 that a password is not identified, the method may return to detect an audio file. If, however, it is determined 825 that a password is identified, the command may be executed at block 830. As part of identifying a command, the command may be compared to a list of approved commands stored in a database, such as the database 505. As part of identifying a password, the password may be compared to a list of approved passwords stored in a database, such as the database 505. Upon executing the command, at block 835 a notification may be transmitted regarding the executed command. For example, the notification may be transmitted to the communications device 125 that originated the voice-mail message. The notification may be a text file converted to an audio file whereupon a user may access the converted audio file via the communications device to learn that the command has been executed on the device 105.

Figure 9:
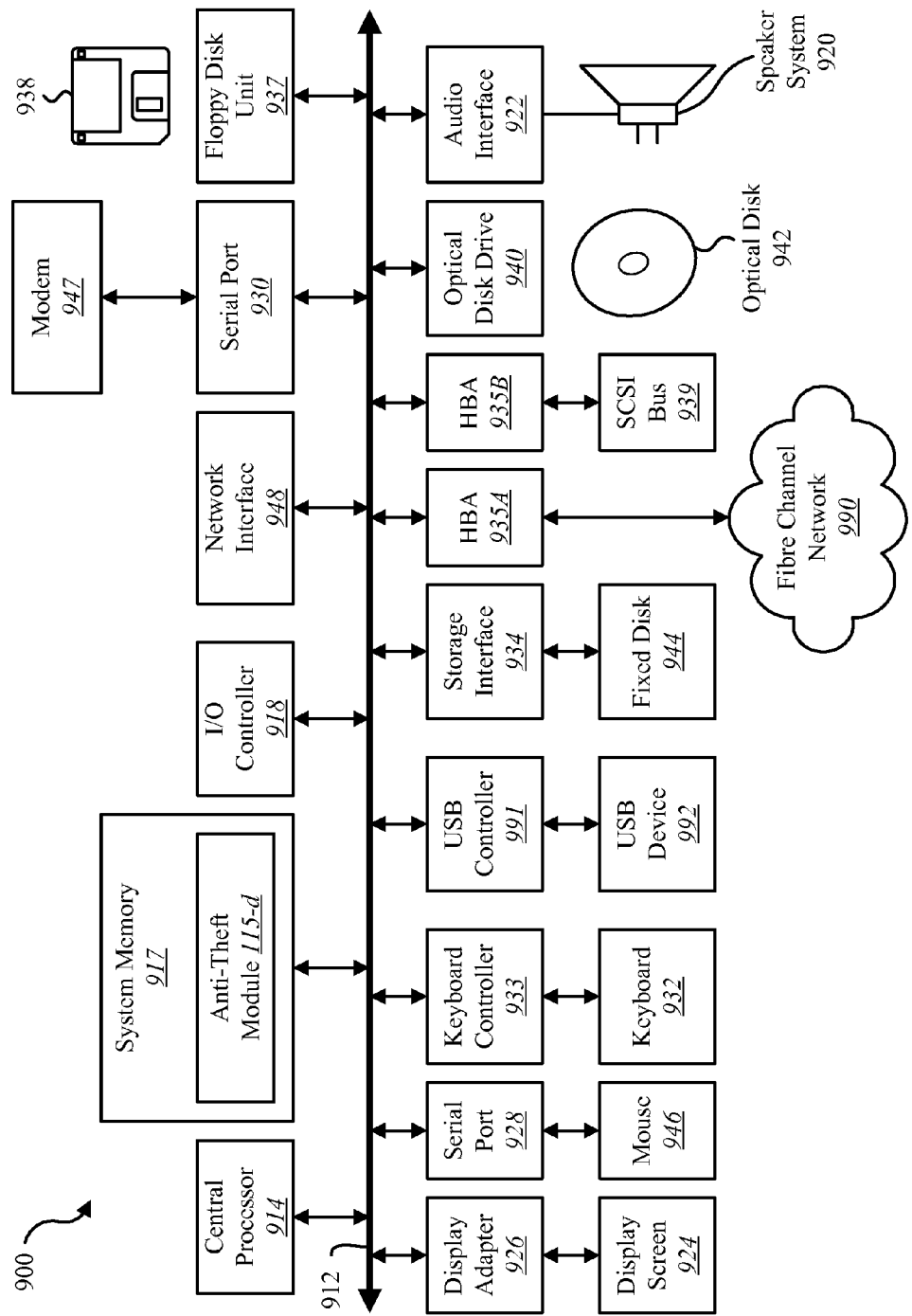
FIG. 9 is a block diagram depicting a network architecture in which client systems, as well as storage servers (any of which can be implemented using computer system), are coupled to a network.

FIG. 9 depicts a block diagram of a computer system 900 suitable for implementing the present systems and methods. Computer system 900 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), multiple USB devices 992 (interfaced with a USB controller 991), a storage interface 934, a floppy disk unit 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, an anti-theft module 115-*d* to implement the present systems and methods may be stored within the system memory 917. The module 115-*d* may be an example of the anti-theft module 115 of FIG. 1, 2, 3, or 6. Applications resident with computer system 900 are generally stored on and accessed via a non-transitory computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 900, can connect to a standard computer readable medium for storage and/or retrieval of information, such as a fixed disk drive 944. Fixed disk drive 944 may be a part of computer system 900 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present systems and methods. The devices and subsystems can be interconnected in different ways from that shown in FIG. 9. The operation of a computer system such as that shown in FIG. 9 is readily known in the art and is not discussed in detail in this application. Code to implement the present disclosure can be stored in a non-transitory computer-readable medium such as one or more of system memory 917, fixed disk 944, optical disk 942, or floppy disk 938. The operating system provided on computer system 900 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
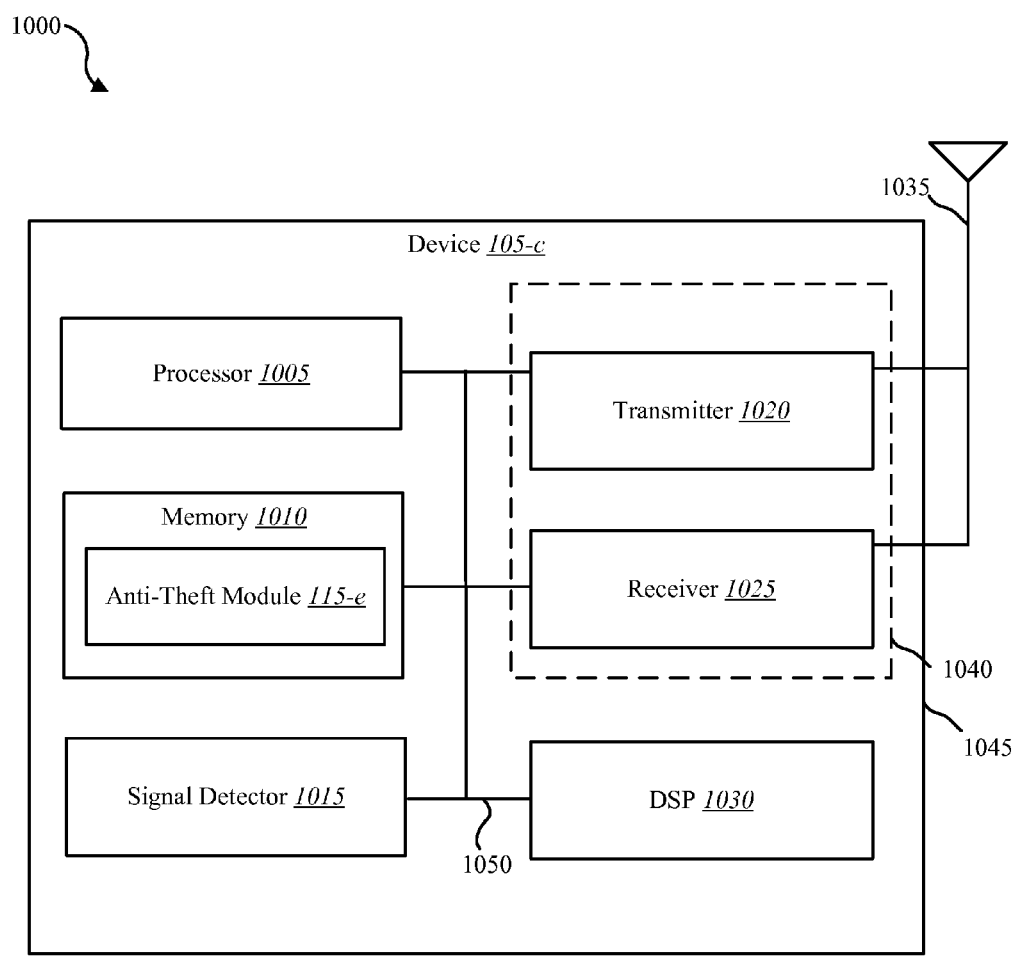
FIG. 10 is a block diagram illustrating a device that may implement the present systems and methods.

FIG. 10 is a block diagram 1000 illustrating a device 105-*b*. The device 105-*c* may include various components that may be used to implement the present systems and methods. The device 105-*c* may be an example of the device of FIG. 1, 2, or 6. The device 105-*c* may be a wireless communications device, such as, but not limited to, a cellular telephone, a smart phone, a PDA, and the like.

The device 105-*c* may include a processor 1005 which controls operation of the device 102-*c*. The processor 1005 may also be referred to as a central processing unit (CPU). Memory 1010, which may include both read-only memory (ROM) and random access memory (RAM), provides instructions and data to the processor 1005. A portion of the memory 1010 may also include non-volatile random access memory (NVRAM). The processor 1005 typically performs logical and arithmetic operations based on program instructions stored within the memory 1010. The instructions in the memory 1010 may be executable to implement the methods described herein. For example, the anti-theft module 115-*e* may be stored in the memory 1010. The module 115-*e* may be an example of the anti-theft module 115 of FIG. 1, 2, 3, 6, or 9.

The communications device 105-*c* may also include a housing 1045 that may include a transmitter 1020 and a receiver 1025 to allow transmission and reception of data between the communications device 105-*c* and a remote location. The transmitter 1020 and receiver 1025 may be combined into a transceiver 1040. An antenna 1035 may be attached to the housing 1045 and electrically coupled to the transceiver 1040. The communications device 105-*c* may also include (not shown) multiple transmitters, multiple receivers, multiple transceivers and/or multiple antennas.

The communications device 105-c may also include a signal detector 1015 that may be used to detect and quantify the level of signals received by the transceiver 1040. The signal detector 1015 may detect such signals as total energy, pilot energy per pseudonoise (PN) chips, power spectral density, and other signals. The communications device 105-c may also include a digital signal processor (DSP) 1030 for use in processing signals.

The various components of the communications device 105-c may be coupled together by a bus system 1050 which may include a power bus, a control signal bus, and a status signal bus in addition to a data bus. However, for the sake of clarity, the various busses are illustrated in FIG. 10 as the bus system 1050.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to execute anti-theft procedures for a device, comprising:
    detecting, by a processor of a mobile communications device, a receipt of a first audio file in a voicemail system external to the mobile communications device, wherein the first audio file comprises a voicemail message;
    downloading, by the processor, the first audio file from the voicemail system;
    identifying, by the processor, a size of the first audio file;
    responsive to the size of the first audio file satisfying a predefined size, converting, by the processor, the first audio file to a first text file, the size of the first audio file satisfying the predefined size being indicative of the first audio file including an anti-theft command;
    analyzing, by the processor, the first text file to identify the anti-theft command, wherein the anti-theft command delivered via the first audio file comprises a lock command, a wipe command, or a find command;
    executing, by the processor, the anti-theft command based at least in part on the analysis;
    upon executing the anti-theft command, generating, by the processor, a second text file;
    converting, by the processor, the second text file to a second audio file;
    determining, by the processor, a telephone number linked to a source of the first audio file;
    upon determining the telephone number, performing, by the processor, a dialing operation to dial the telephone number linked to the source of the first audio file; and
    upon connecting with the source of the first audio file, communicating, by the processor, the second audio file to the source of the first audio file.

2. The method of claim 1, further comprising:
    analyzing the first text file to identify a passcode associated with the anti-theft command.

3. The method of claim 2, wherein analyzing the first text file further comprises:
    comparing the anti-theft command to a list of anti-theft commands;
    comparing the passcode to a list of passcodes; and
    executing the anti-theft command based at least in part on the comparison.

4. The method of claim 1, wherein the second audio file comprises a notification that the anti-theft command has been executed.

5. The method of claim 1, wherein detecting the receipt of the first audio file further comprises:
    detecting a download of the first audio file.

6. A device configured to execute anti-theft procedures, comprising:
    a processor of a mobile communications device; and
    memory in electronic communication with the processor; and
    instructions stored in the memory, the instructions being executable by the processor to:
    detect a receipt of a first audio file in a voicemail system external to the mobile communications device, wherein the first audio file comprises a voicemail message;
    download the first audio file from the voicemail system;
    identify, by the processor, a size of the first audio file;
    responsive to the size of the first audio file satisfying a predefined size, convert, by the processor, the first audio file to a first text file, the size of the first audio file satisfying the predefined size being indicative of the first audio file including an anti-theft command;
    analyze, by the processor, the first text file to identify the anti-theft command, wherein the anti-theft command delivered via the first audio file comprises a lock command, a wipe command, or a find command; and execute by the processor the anti-theft command based at least in part on the analysis;

upon executing the anti-theft command, generate a second text file;

convert the second text file to a second audio file;

determine a telephone number linked to a source of the first audio file;

upon determining the telephone number, perform a dialing operation to dial the telephone number linked to the source of the first audio file; and upon connecting with the source of the first audio file, communicate the second audio file to the source of the first audio file.

7. The device of claim 6, wherein the instructions are further executable by the processor to:

analyze the first text file to identify a passcode associated with the anti-theft command.

8. The device of claim 7, wherein the instructions to analyze the text file are further executable by the processor to:

compare the anti-theft command to a list of anti-theft commands;

compare the passcode to a list of passcodes; and execute the anti-theft command based at least in part on the comparison.

9. The device of claim 6, wherein the second audio file comprises a notification that the anti-theft command has been executed.

10. The device of claim 6, wherein the instructions to detect the receipt of the first audio file are further executable by the processor to:

detect a download of the first audio file.

11. A computer-program product to execute, via a processor of a mobile communications device, anti-theft procedures for a device, the computer-program product comprising a non-transitory computer-readable medium having instructions thereon, the instructions being executable by the processor to:

detect a receipt of a first audio file in a voicemail system external to the mobile communications device, wherein the first audio file comprises a voicemail message;

download the first audio file from the voicemail system;

identify, by the processor, a size of the first audio file;

responsive to the size of the first audio file satisfying a predefined size, convert, by the processor, the first audio file to a first text file, the size of the first audio file satisfying the predefined size being indicative of the first audio file including an anti-theft command;

analyze, by the processor, the first text file to identify the anti-theft command, wherein the anti-theft command delivered via the first audio file comprises a lock command, a wipe command, or a find command; and execute by the processor the anti-theft command based at least in part on the analysis;

upon executing the anti-theft command, generate a second text file;

convert the second text file to a second audio file;

determine a telephone number linked to a source of the first audio file;

upon determining the telephone number, perform a dialing operation to dial the telephone number linked to the source of the first audio file; and upon connecting with the source of the first audio file, communicate the second audio file to the source of the first audio file.

12. The computer-program product of claim 11, wherein the instructions are further executable by the processor to:

analyze the first text file to identify a passcode associated with the anti-theft command.

* * * * *